United States Patent

Imai et al.

[11] Patent Number: 6,088,131
[45] Date of Patent: Jul. 11, 2000

[54] COMMUNICATION APPARATUS

[75] Inventors: Satoshi Imai, Koganei; Toru Maeda, Mitaka; Hitoshi Saito, Yokohama; Masanori Momose, Tokyo; Toru Fujino, Urawa; Shinichiro Kohri; Makoto Kobayashi, both of Kawasaki; Kazuhiro Sugawara, Tokyo; Naomi Nakamura, Kawaguchi; Yasushi Morimoto, Yokohama, all of Japan

[73] Assignee: Canon Kabushiki Kaisha, Tokyo, Japan

[21] Appl. No.: 08/729,699

[22] Filed: Oct. 7, 1996

[30] Foreign Application Priority Data

Oct. 9, 1995 [JP] Japan .................................. 7-286369
Oct. 30, 1995 [JP] Japan .................................. 7-303415

[51] Int. Cl.$^7$ ........................... H04N 1/387; H04N 1/40; B41B 15/00
[52] U.S. Cl. .......................... 358/450; 358/450; 358/448; 358/449; 358/402; 358/403; 395/117; 395/116; 395/115; 395/114
[58] Field of Search .................................. 358/449, 448, 358/450, 452, 462, 437, 444, 404, 468, 439, 435, 434; 395/117, 102, 112, 114, 115, 116, 110, 101

[56] References Cited

U.S. PATENT DOCUMENTS

| | | | |
|---|---|---|---|
| 4,679,093 | 7/1987 | Yaguchi | 358/449 |
| 5,095,373 | 3/1992 | Hisano | 358/444 |
| 5,642,473 | 6/1997 | Klotz, Jr. | 358/448 |

*Primary Examiner*—Edward L. Coles
*Assistant Examiner*—Twyler Lamb
*Attorney, Agent, or Firm*—Fitzpatrick, Cella, Harper & Scinto

[57] ABSTRACT

A communication apparatus can transmit image data stored in a memory in a manner capable of reducing the running cost. The number of input lines for each page is recognized for image data of a plurality of pages input and stored in the memory. When transmitting the stored image data of the plurality of pages, the number of recordable lines per page of a recording sheet used in a communication partner's terminal is recognized, and image data for one page obtained by combining image data of a plurality of consecutive pages is transmitted. The reception side combines a maximum number of image data for a plurality of pages recordable on a single recording sheet, and transmits the obtained image data as image data for one page. Image data of different files for the same communication partner are also combined in the above-described manner.

16 Claims, 7 Drawing Sheets

COMMUNICATION APPARATUS

BACKGROUND OF THE INVENTION

1. Field of the Invention

This invention relates to a communication apparatus, particularly a facsimile apparatus, and to a facsimile transmission method. More particularly, the invention relates to a facsimile apparatus and a facsimile transmission method having a memory transmission function of temporarily storing input image data in a memory and then transmitting the stored image data.

2. Description of the Related Art

A description will now be provided illustrating a facsimile apparatus as a communication apparatus.

Facsimile apparatuses having a memory transmission function of temporarily storing image data read by an image reading unit in a memory and then transmitting the stored image data have been known. The memory transmission function is utilized, for example, in a time transmission function in which transmission times are set in advance for respective communication partners (receivers), and a plurality of stored image data (a plurality of files) are automatically transmitted to the corresponding receiver at a time when the time set for the receiver arrives.

In this kind of facsimile apparatuses, when transmitting image data of a plurality of originals (a plurality of files) for the same receiver stored in the memory, image data read from a single original is transmitted as image data for one page irrespective of the length of image data of each original in the sub-scanning direction.

Accordingly, even if the length of an original in the sub-scanning direction is small and therefore the number of read lines is small, read image data is transmitted as image data for one page. At that time, at the reception side, for example, an image is recorded only on an upper portion of a recording sheet (cut paper), and a large blank portion if formed at a lower portion of the sheet, resulting in wasteful use of the recording sheet. Moreover, when recording received image data of a plurality of pages, sheets must be fed more than necessary for the amount of blank portions, thereby causing problems in that, for example, the recording speed is reduced and the running cost increases.

SUMMARY OF THE INVENTION

The present invention has been made in consideration of the above-described problems.

It is an object of the present invention to provide an improved communication apparatus.

It is another object of the present invention to provide an improved facsimile apparatus.

It is still another object of the present invention to provide an apparatus which can transmit image data stored in a memory in a manner capable of reducing the running cost.

According to one aspect, the present invention which achieves these objectives relates to a communication apparatus comprising first recognition means for recognizing the number of input lines for each page for image data of a plurality of pages input by image input means, storage means for storing the image data input by the image input means together with information relating to a partner to which the image data is to be transmitted and document identification information of the image data, transmission means for transmitting the image data stored in the storage means, second recognition means for recognizing the number of recordable lines per page of a recording sheet used in the communication partner's terminal, and control means for causing the transmission means to combine image data of a plurality of consecutive pages, and transmit the obtained image data as image data for one page, based on the number of input lines recognized by the first recognition means and the number of recordable lines recognized by the second recognition means.

The foregoing and other objects, advantages and features of the present invention will become more apparent from the following description of the preferred embodiments taken in conjunction with the accompanying drawings.

DESCRIPTION OF THE PREFERRED EMBODIMENTS

A communication apparatus according to embodiments of the present invention will now be described in detail illustrating a facsimile apparatus with reference to the drawings.

Figure 1:
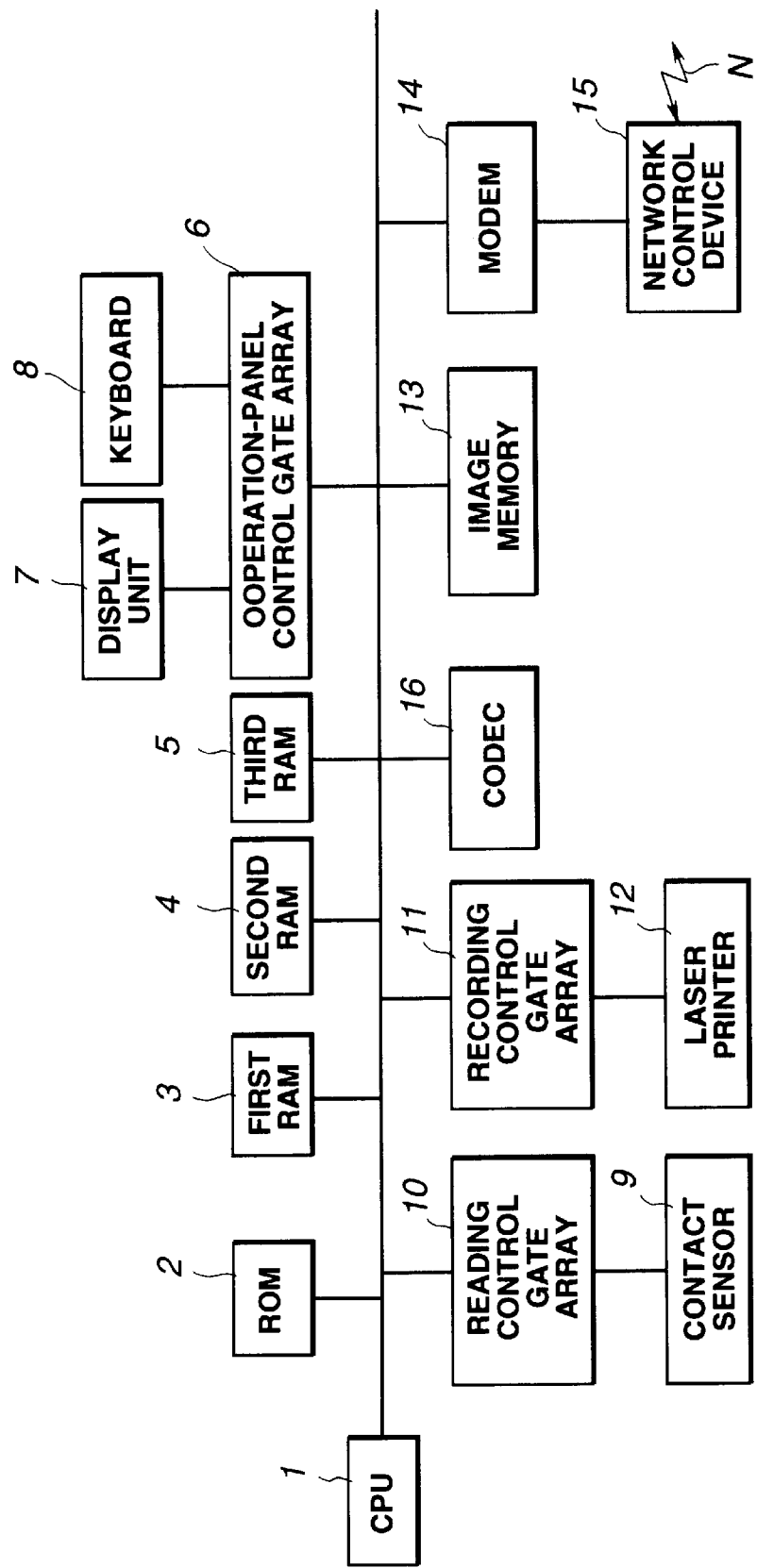
FIG. 1 is a block diagram illustrating the configuration of a facsimile apparatus commonly used in first through third embodiments of the present invention.

FIG. 1 is a block diagram illustrating the configuration of a facsimile apparatus commonly used in first through third embodiments of the present invention.

The facsimile apparatus shown in FIG. 1 performs various kinds of processing relating to facsimile transmission under the control of a CPU (central processing unit) 1. A ROM (read-only memory) 2, first, second and third RAM's (random access memories) 3, 4 and 5, an operation-panel control gate array 6, a reading control gate array 10, a recording control gate array 11, an image memory 13, a modem (modulator-demodulator) 14, and a codec (coder-decoder) 16 are connected to the CPU 1. Although omitted in FIG. 1, the codec 16 comprises a coder, a multiplexing circuit, a multiplex separation circuit, a decoder and the like.

A display unit 7 and a keyboard 8 are connected to the operation-panel control gate array 6. A contact sensor 9 is connected to the reading control gate array 10. A laser printer 12 is connected to the recording control gate array 11. a network control device 15 is connected to the modem 14.

Figure 4:
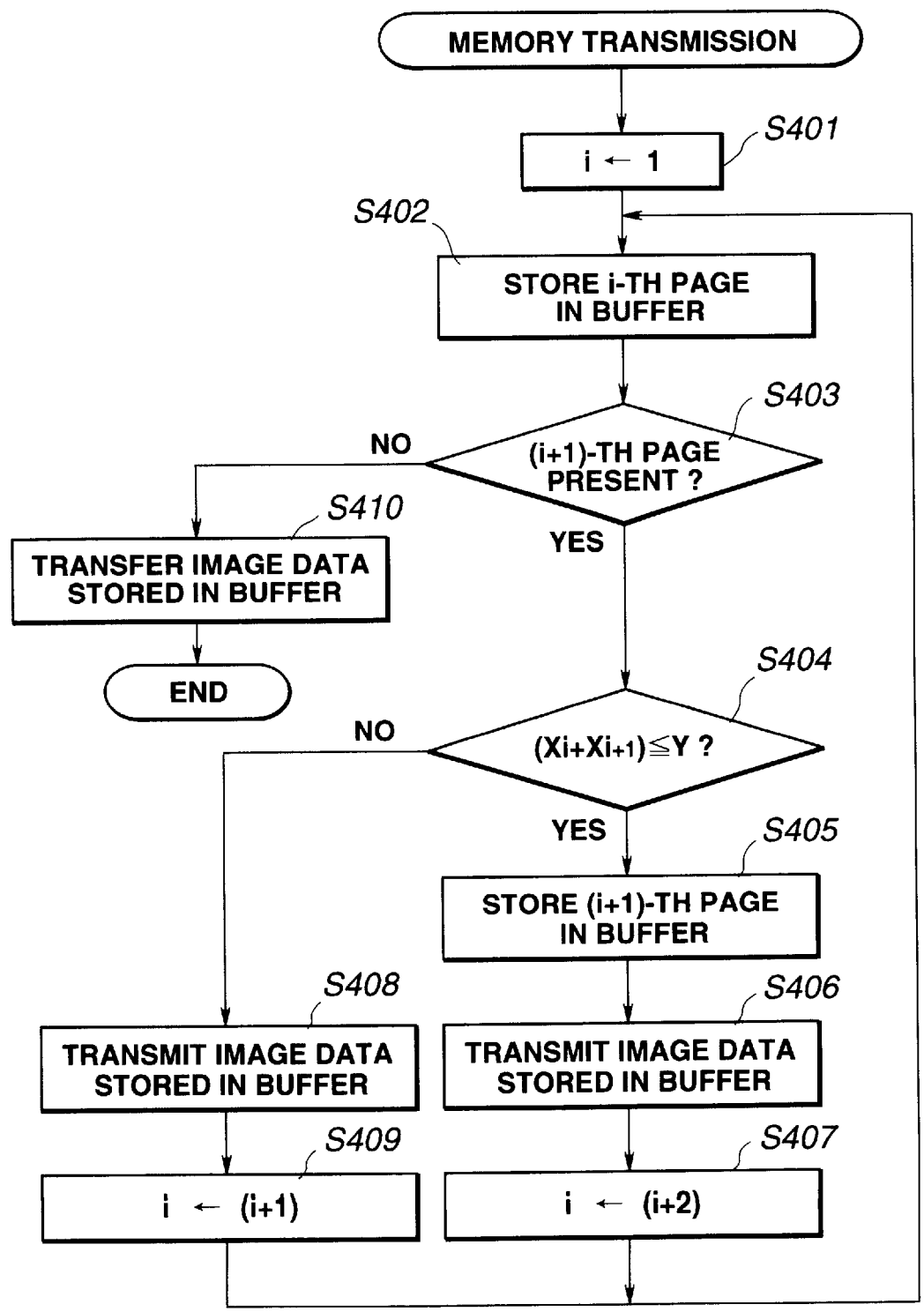
FIG. 4 is a flowchart illustrating a memory transmission operation in the first embodiment.
Figure 6:
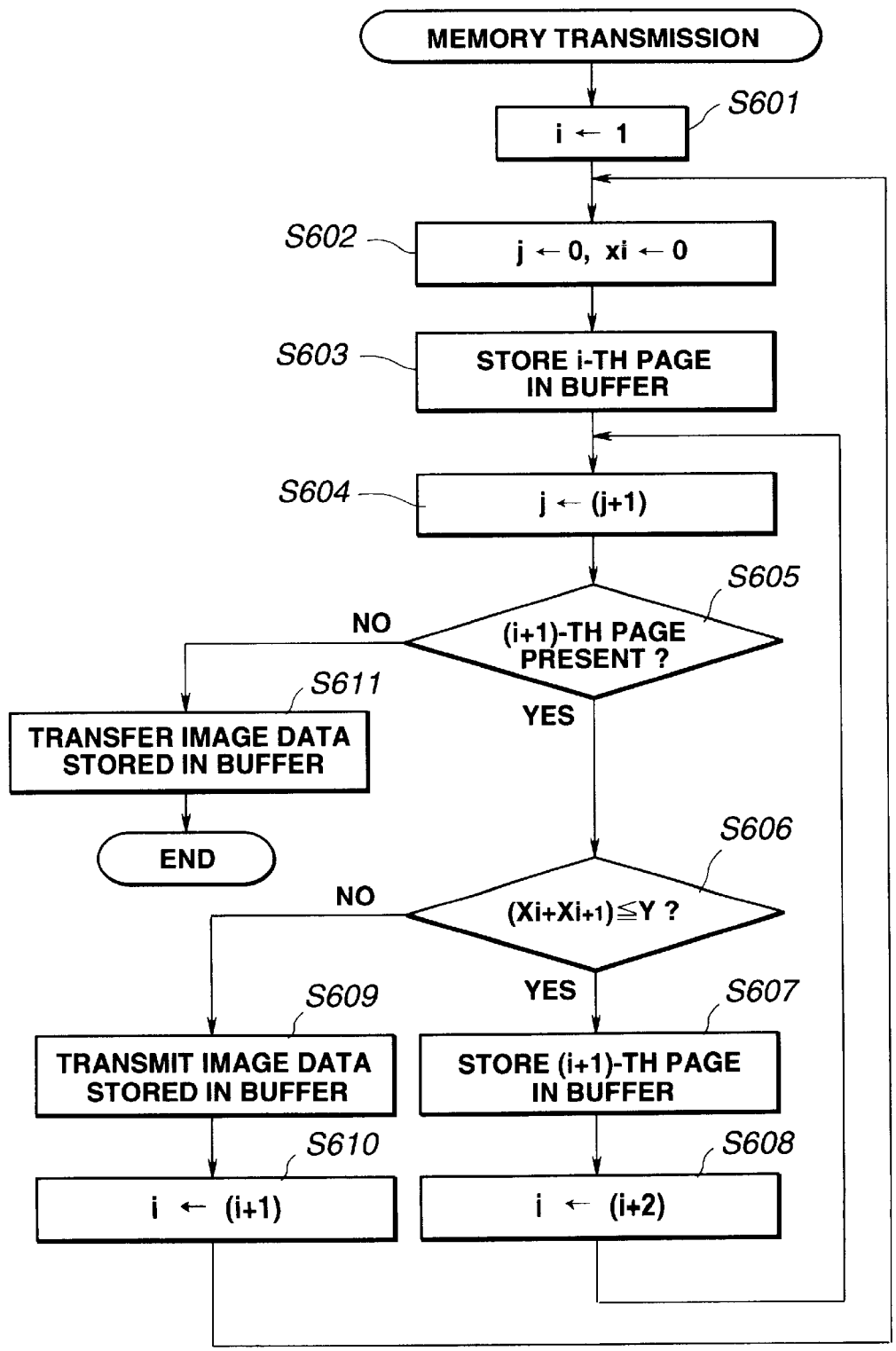
FIG. 6 is a flowchart illustrating a memory transmission operation in the second embodiment.

The CPU 1 executes binary-code control procedures conforming to the ITU-T (International Telecommunication Union-Telecommunication Standardization Sector) recommendation, and various kinds of processing corresponding to the flowcharts shown in FIGS. 4 and 6 by controlling the respective units according to various kinds of programs preset in the ROM 2. At that time, the CPU 1 utilizes the first RAM 3 as work areas.

The contact sensor 9 comprises a photoelectric transducer, such as a CCD (charge-coupled device) or the like, and converts an image of an original photoelectrically read under the control of the reading control gate array 10 into an electrical signal and outputs the signal as image data. The reading control gate array 10 performs compression encoding of image data read by the contact sensor, and stores the resultant data in the image memory 13 comprising a DRAM (dynamic random access memory) or the like.

At that time, information for controlling the image data stored in the image memory 13, comprising a reception number (a document identification number), information relating to the communication partner, the number of pages, information relating to memory blocks for the stored image data, resolution, the image size, the number of read lines of each page, and the like, is stored in the second RAM 4 under the control of the CPU 1. The reading control gate array 10 recognizes and outputs the above-described number of read lines when performing compression encoding of the image data. The second RAM 4 stores a time to transmit a plurality of image data having different reception numbers to each of communication partners at a time (a transmission time). When a transmission time arrives, the file of a plurality of image data for the corresponding communication partner stored in the image memory 13 is continuously transmitted.

When transmitting image data stored in the image memory 13, the image data is encoded and compressed in accordance with the mode of the receiver's facsimile apparatus by the coder within the codec 16 under the control of the CPU 1. The data is further modulated by the modem 14 and is output to a network N via the network control device 15. When transmitting image data, control information for the image data is read from the second RAM 4 in order to transmit it together with the image data and is then multiplexed with the image data by the multiplexing circuit within the codec 16, and the resultant data is transmitted.

The image memory 13 stores image data read by the contact sensor 9, image data to be transmitted, received image data and image data to be recorded, and includes respective areas for a buffer for reading, a buffer for transmission, a buffer for reception, and a buffer for recording for storing these image data.

Image data received via the network N and the network control device 15 is demodulated by the modem 14 under the control of the CPU 1, and errors in the data are checked and corrected. The obtained data is then decoded and expanded by the decoder within the codec 16 and is stored in the image memory 13. Thereafter, the data is recorded by printing by the laser printer 12 under the control of the recording control gate array 11. At that time, control information received together with the image data is separated by the multiplex separation circuit within the codec 16 and is stored in the second RAM 4. Thereafter, the data is recorded by printing by the laser printer 12.

Although omitted in FIG. 1, various functional keys, such as a ten-digit keypad for inputting information relating to a communication partner (a facsimile number), transmission times and the like, a resolution setting key for setting the degree of resolution, such as standard, fine, superfine or the like, a start key for instructing start of transmission, a completion-mark key for stamping a completion mark indicating completion of transmission on an original whose image has been transmitted, and the like, are arranged on the keyboard 8. The states of operations of these keys are detected by the operation-panel control gate array 6, and the corresponding input information, set information, commands and the like are stored in the third RAM 5 under the control of the CPU 1.

The display unit 7 comprises a liquid-crystal display. Information corresponding to the operation key on the keyboard 8, time information and the like are displayed on the display unit 7 by the operation-panel control gate array 6 under the control of the CPU 1.

Figure 2:
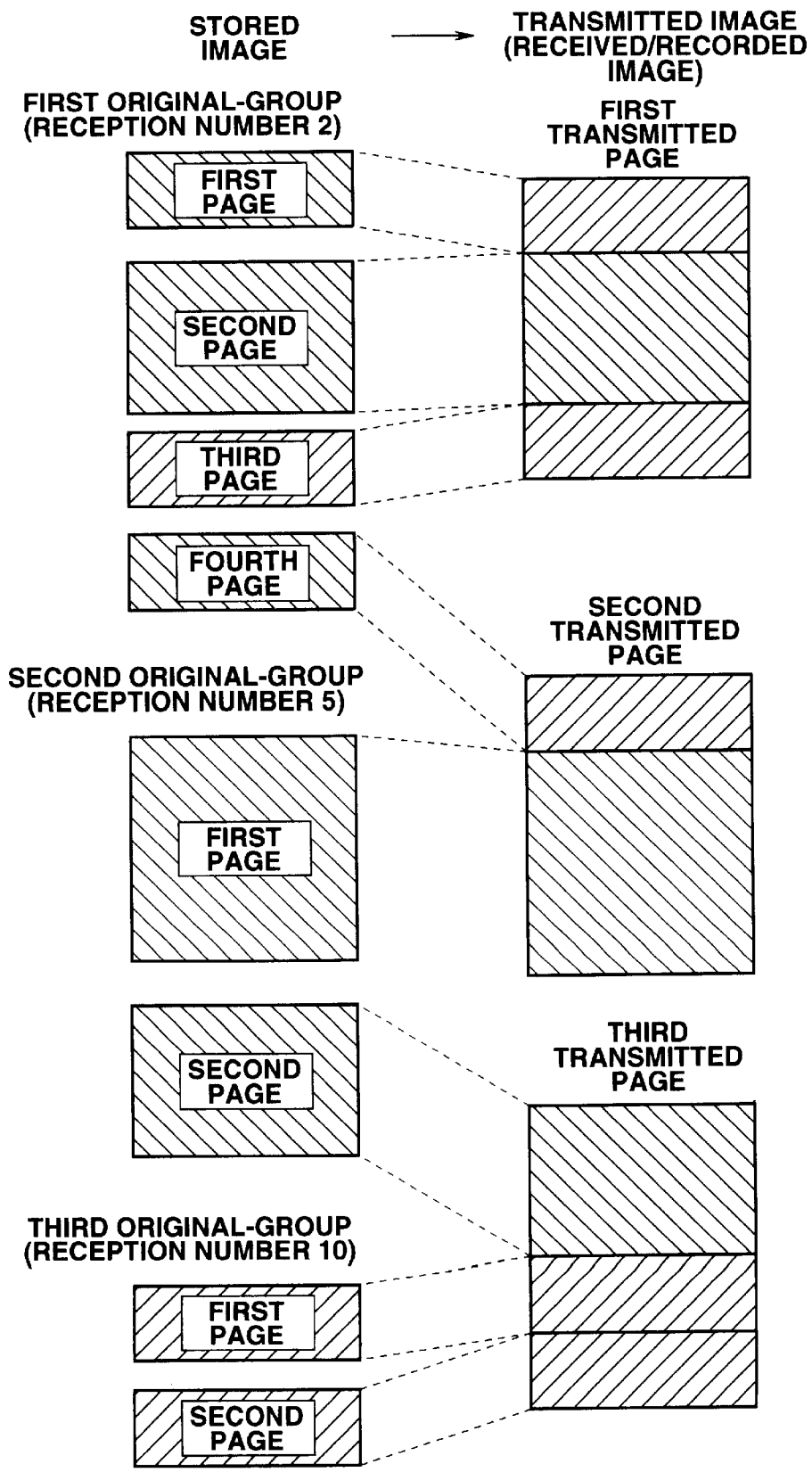
FIG. 2 is a diagram illustrating a manner of combining image data to be transmitted.

In the first and second embodiments, the facsimile apparatus having the above-described configuration performs memory transmission as shown in FIG. 2. More strictly, FIG. 2 corresponds to the second embodiment.

That is, in the first and second embodiments, read image data is temporarily stored in the image memory 13, and a group of image data for the same communication partner (receiver) is transmitted at a time. At that time, even if the reception number differs (as the first original-group, the second original-group and the third original-group shown in FIG. 2), a group of image data for the same receiver is considered as having consecutive pages, and image data for one page, obtained by combining images of a plurality of consecutive pages within a range of not exceeding the number of recordable lines on the recording sheet (the length of the recording sheet) set in the receiver's facsimile apparatus, is transmitted.

For example, in the case of FIG. 2, image data for four pages of a first original-group having a reception number 2, image data for two pages of a second original-group having a reception number 5, and image data for two pages of a third original-group having a reception number 10 are stored in the image memory 13 as image data for the same receiver. Although image data for other receivers (having reception numbers 1, 3, 4, 6, 7, 8 and 9) are also stored in the image memory 13, these data are omitted in FIG. 2.

If all of the image data for four pages of the first original-group having the reception number 2 are combined, the obtained image data exceeds the length of the recording sheet. However, if image data of the first through third pages of the first original-group are combined, the obtained image data does not exceed the length of the recording sheet. Hence, the image data of the first through third pages of the first original-group are combined and transmitted as image data for the first page.

If the image data of the remaining fourth page of the first original-group having the reception number 2 and all of the image data for two pages of the second original-group having the reception number 5 are combined, the obtained image data exceeds the length of the recording sheet. However, if the image data of the remaining fourth page of the first original-group having the reception number 2 and the image data of the first page of the second original-group having the reception number 5 are combined, the obtained image data does not exceed the length of the recording sheet. Hence, the image data for the remaining fourth page of the first original-group having the reception number 2 and the image data of the first page of the second original-group having the reception number 5 are combined, and the obtained image data is transmitted as image data for the second page.

If image data of the remaining second page of the second original-group having the reception number 5 and all of the image data for two pages of the third original-group having the reception number 5 are combined, the obtained image data does not exceed the length of the recording sheet. Hence, these image data are combined, and the obtained image data is transmitted as image data for the third page.

First Embodiment

Figure 3:
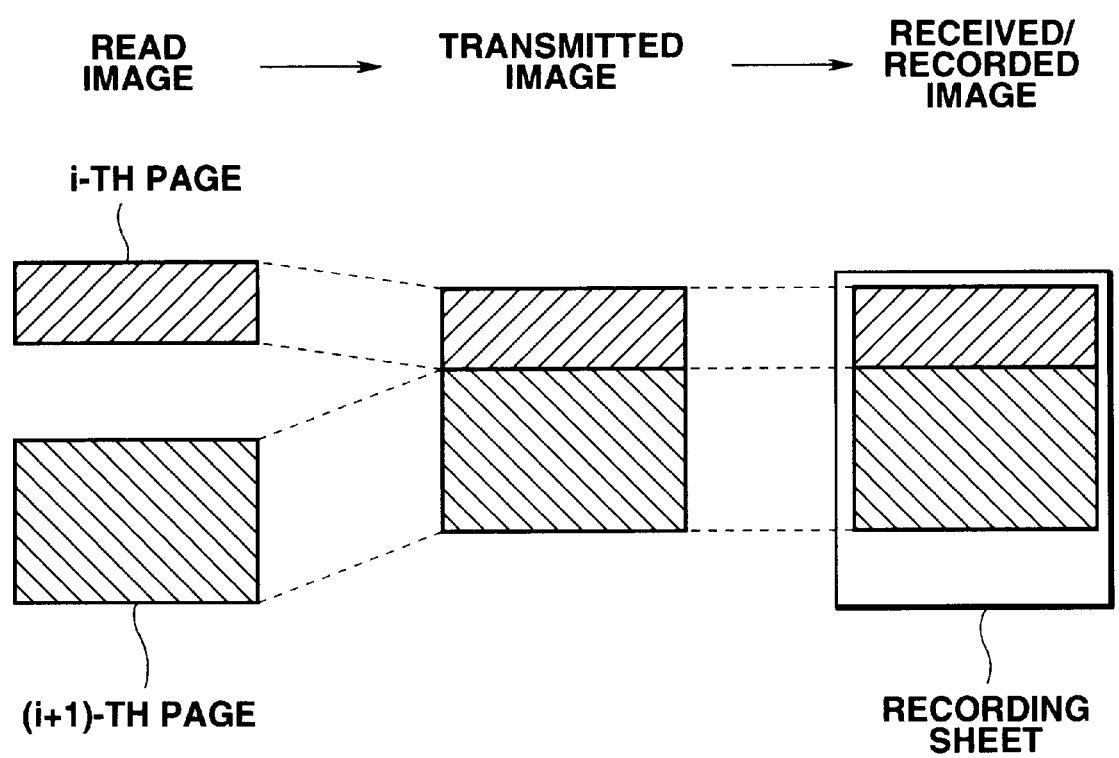
FIG. 3 is a diagram illustrating a manner of combining image data to be transmitted in the first embodiment.

In the first embodiment, as shown in FIG. 3, the number of pages of image data to be combined is limited to two. In the first embodiment, also, a group of image data for the same receiver stored in the image memory 13 is considered to have consecutive pages even if the reception number differs, and these image data are combined together.

Next, a description will be provided of the memory transmission operation in the first embodiment with reference to the flowchart shown in FIG. 4.

This flowchart illustrates a flow when it is assumed that, all pages have the same width of the original to be read and the same degree of reading resolution. This flow is started by assignment of the receiver (the receiver's terminal) through the keyboard 8 and by instruction of transmission at a time, or is automatically started based on time-transmission information stored in the second RAM 4. A page counter i (to be described later) is updated by considering a group of image data for the same receiver to have consecutive pages irrespective of the reception number. Facsimile transmission/reception is performed according to a signal sequence conforming to binary-code control procedures of the ITU-T recommendation 30. Whether or not image data are for the same receiver is determined based on communication partner's information, serving as control information, stored in the second RAM 4 (the above-described conditions in this flow are also effective for the flow shown in FIG. 6 (to be described later)).

First, the CPU 1 performs initial setting of "1" in the page counter i as the page number (step S401). Then, the image data of the page having the number indicated by the page counter i (hereinafter termed the "i-th page") is read from among image data for the receiver to which transmission is assigned stored in the buffer for reading within the image memory 13, and the read image data is stored in the buffer for transmission (formed within the image memory 13) (step S402).

Then, it is determined if the image data of the next page, i.e., the (i+1)-th page, for the same receiver is stored in the image memory 13 (step S403). If the result of the determination in step S403 is affirmative, it is then determined if the sum $(x_i+x_{i+1})$ of the number $x_i$ of read lines on the i-th page and the number $x_{i+1}$ of read lines on the (i+1)-th page is equal to or less than the number y of recordable lines per page of the recording sheet set in the receiver's apparatus (step S404).

The number y of recordable lines is recognized by referring to information relating to the width of the recording sheet, and the like included in a digital initial identification signal (DIS signal) transmitted from the receiver's terminal in preprocedures (binary-code control procedures) during communication. For example, if the width of the recording sheet corresponds to the A4 size and the degree of reading resolution is standard, the number of recordable lines with standard resolution on the A4-size recording sheet is set as the number y of recordable lines.

If the result of the determination in step S404 is affirmative, the image data of the (i+1)-th page is read from the buffer for reading within the image memory 13 and is stored in the buffer for transmission (step S405), and image data within the buffer for transmission, i.e., the image data of the i-th page and the image data of the (i+1)-th page are combined as image data for one page, and the obtained image data is transmitted (step S406).

In this case, by transmitting a control return signal (RTC signal) in binary-code control procedures conforming to the ITU-T recommendation 30 after transmitting the image data obtained by combining the image data of the i-th page and the image data of the (i+1)-th page, the receiver's terminal is notified of the fact that the image data of the ith page and the image data of the (i+1)-th page constitute image data for one page of the recording sheet. Then, the number of the page counter i is incremented by "2" (step S407), and the process returns to step S402.

If the result of the determination in step S404 is negative, image data within the buffer for transmission, i.e., the image data of the i-th page is transmitted (step S408). Then, the number of the page counter i is incremented by "1" (step S409), and the process returns to step S402.

If the result of the determination in step S403 is negative, this indicates that the i-th page is the final page of one communication operation. Hence, the image data of the i-th page within the buffer for transmission is transmitted (step S410), and the process is terminated. In steps S408 and S410, also, by transmitting a control return signal (RTC signal) in binary-code control procedures conforming to the ITU-T recommendation 30 after transmitting the image data of the i-th page, the receiver's terminal is notified of the fact that the image data of the i-th page and the image data of the (i+1)-th page constitute image data for one page of the recording sheet.

As described above, in the first embodiment, when transmitting a plurality of stored image data (including data having different reception numbers) for the same communication partner (receiver) at a time, if image data for two pages to be transmitted can be recorded on a single recording sheet, the transmission side transmits the image data for two pages as image data for one page. Hence, for example, when performing time transmission, a blank portion in the recording sheet can be minimized, and wasteful sheet feeding for the amount of the blank portion becomes unnecessary, resulting in high-speed recording and a decrease in the running cost.

Second Embodiment

Figure 5:
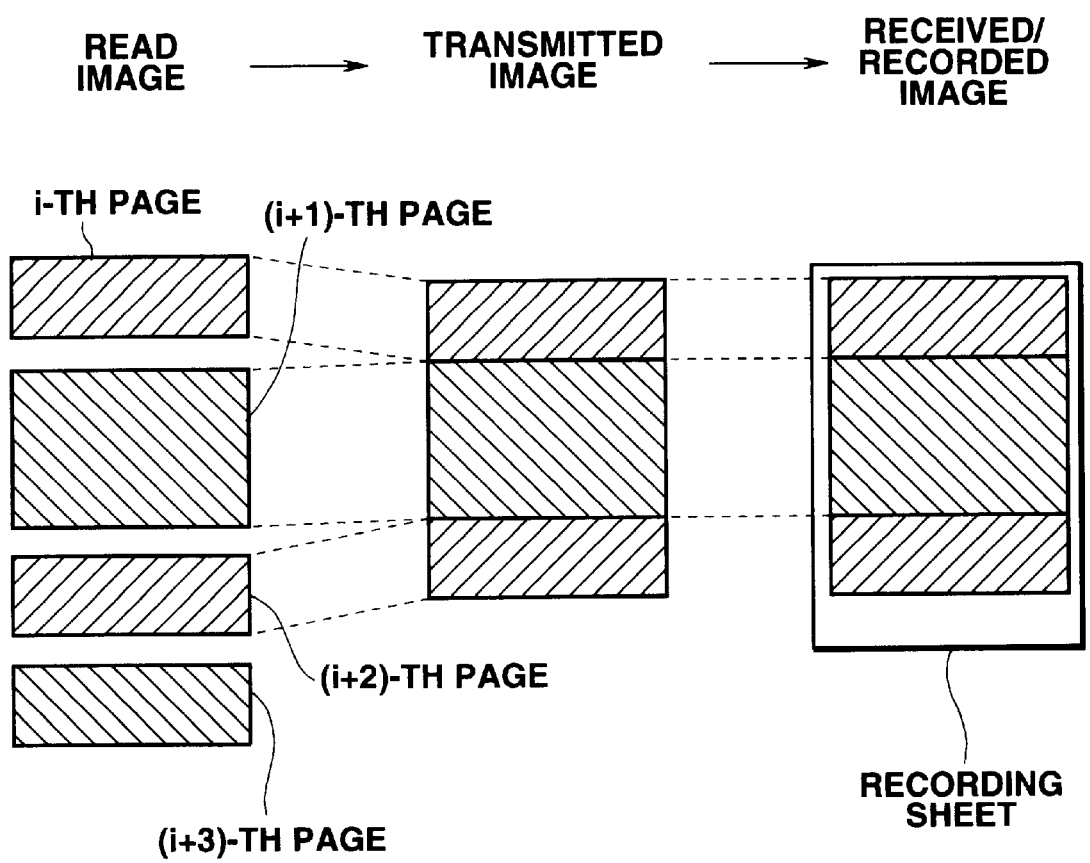
FIG. 5 is a diagram illustrating a manner of combining image data to be transmitted in the second embodiment.

In the second embodiment, as shown in FIG. 5, the number of pages of image data capable of being combined within the range of the number of recordable lines on the recording sheet set in the receiver's apparatus is not limited to two, but is set to an arbitrary number. Accordingly, as shown in FIG. 2, image daga for two pages, image data for three pages, image data for four pages, or more image data are combined as image data for one page (one recording sheet), and the obtained image data is transmitted and recorded.

A description will now be provided of the memory transmission operation in the second embodiment with reference to the flowchart shown in FIG. 6.

First, the CPU 1 performs initial setting of "1" in the page counter i as the page number (step S601), and a page counter j and a variable $x_i$ are subjected to initial setting of "0" (step S602). The page counter j indicates the number of pages from the i-th page of image data to be stored in the buffer for transmission, and the variable $x_i$ indicates the total number of read lines of image data already stored in the buffer for transmission.

Then, the image data of the page having the number indicated by the page counter i (hereinafter termed the "i-th page") is read from among image data for the receiver for which transmission is assigned stored in the buffer for reading within the image memory 13, and is stored in the buffer for transmission (formed within the image memory 13), and the number of lines of the i-th page is set in the variable $x_i$ (step S603).

Then, the number of the page counter j is incremented by "1" (step S604), and it is determined if the image data of the (i+j)-th page is stored in the image memory 13 (step S605). If the result of the determination in step S605 is affirmative, it is then determined if the sum $(x_i+x_{i+j})$ of the number $x_i$ of read lines the entire image data already stored in the buffer for transmission and the number $x_{i+j}$ of lines to be read of the image data of the (i+j)-th page is equal to or less than the number y of recordable lines (step S606).

If the result of the determination in step S606 is affirmative, the image data of the (i+j)-th page is read from the image memory 13 and is stored in the buffer for transmission (step S607). The variable $x_i$ is then incremented by $X_{i+j}$ (step S608), and the process returns to step S604. Thus, storage in the buffer for transmission is performed immediately before the sum $(x_i+x_{i+j})$ of the number $x_i$ of read lines of the entire image data already stored in the buffer for transmission and the number $x_{i+j}$ of lines to be read of the image data of the (i+j)-th page exceeds the number y of recordable lines.

If the result of the determination in step S606 is negative, image data for a plurality of pages stored within the buffer for transmission are combined as image data for one page and the obtained image data is transmitted (step S609), and the number of the page counter i is incremented by "j" (step S610), and the process returns to step S602.

If the result of the determination in step S605 is negative, image data stored in the buffer for transmission is transmitted (step S611), and the process is terminated. At that time, when image data for a plurality of pages are stored within the buffer for transmission, the image data for the plurality of pages are combined as image data for one page, and the obtained image data is transmitted. When only image data for one page is stored, the image data is transmitted. As in the first embodiment, the receiver's terminal recognizes the image data for one page by a control return signal (RTC signal).

As described above, in the second embodiment, when transmitting a plurality of stored image data (including data having different reception numbers) for the same communication partner (receiver) at a time, if image data for a plurality of pages to be transmitted can be recorded on a single recording sheet, the transmission side transmits image data for one page obtained by combining image data for a maximum number of pages which can be recorded on a single recording sheet. Hence, for example, when performing time transmission, a blank portion in the recording sheet can be minimized, and wasteful sheet feeding for the amount of the blank portion becomes unnecessary, resulting in high-speed recording and a decrease in the running cost.

Third Embodiment

Figure 7:
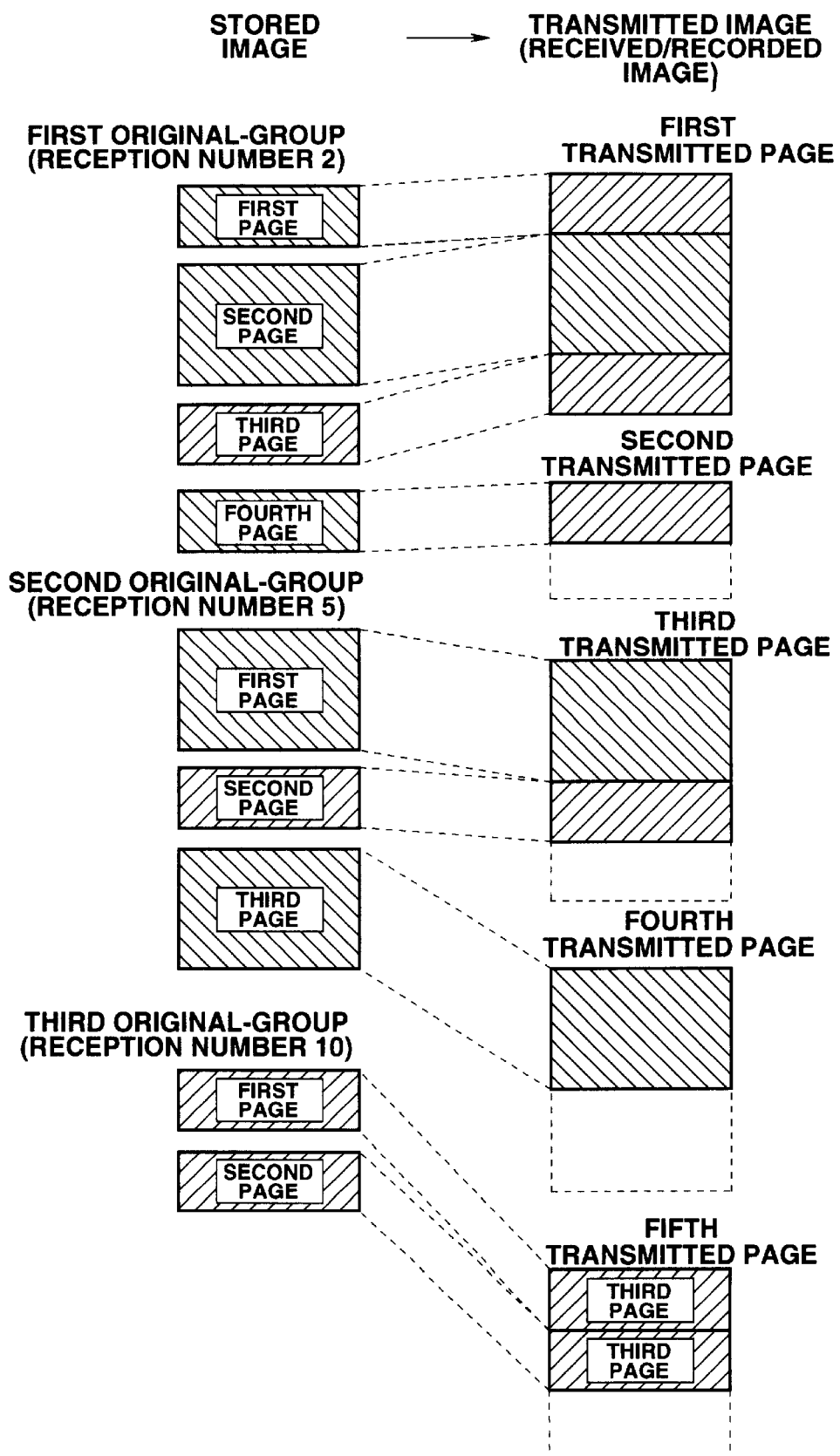
FIG. 7 is a diagram illustrating a manner of combining image data to be transmitted when a third combining method in which image data having different reception numbers are not combined is selected.

In the third embodiment shown in FIG. 7, as in the case shown in FIG. 2, image data for four pages of a first original-group having a reception number 2, image data for three pages of a second original-group having a reception number 5, and image data for two pages of a third original-group having a reception number 10 are stored as image data for the same receiver. In the third embodiment, however, a third combining method is adopted in contrast to the case shown in FIG. 2.

In this case, if all of the image data for four pages of the first original-group having the reception number 2 are combined, the length of the obtained data exceeds the length of the recording sheet. However, if the image data of the first through third pages of the first original-group are combined, the length of the obtained data does not exceed the length of the recordng sheet. Hence, the image data of the first through third pages are combined as image data for the first page, and the obtained image data is transmitted.

Even if the image data of the remaining fourth page of the first original-group having the reception number 2 and the image data of the first and second pages of the second original-group having the reception number 5 are combined, the length of the obtained image does not exceed the length of the recording sheet. However, since image data having different reception numbers are combined in this approach, only the image data of the remaining fourth page of the first original group having the reception number 2 is transmitted as image data for the second page to be transmitted.

If all of the image data for three pages of the second original-group having the reception number 5 are combined, the length of the obtained image exceeds the length of the recording sheet. Hence, only the image data of the first and second pages of the second original-group having the reception number 5 are combined as image data for the third page, and the obtained image data is transmitted.

Even if the image data of the remaining third page of the second original-group having the reception number 5 and the image data of the first and second pages of the third original-group having the reception number 5 are combined, the length of the obtained image data does not exceed the length of the recording sheet. However, since image data having different reception numbers are combined in this approach, combination is rearranged so that only image data having the same reception number are transmitted at a time. Hence, only the image data of the remaining third page of the second original-group having the reception number 5 is transmitted as image data for the fourth page, and the image data of the first and second pages of the third original-group having the reception number 10 are combined and the obtained image data is transmitted as image data for the fifth page.

In the above-described third combining method, since recording of image data having different reception numbers on a single recording sheet by being mixed can be prevented, the reception side can distinctly discriminate between groups of image data having different reception numbers.

In the third embodiment, the processing shown in FIG. 4 or 6 is performed for a page including image data having the same reception number. When a page includes image data having different reception numbers, the processing shown in FIG. 4 or 6 is performed separately for each page including image data having the same reception number.

The present invention is not limited to the above-described embodiments. For example, the above-described combination transmission control can be performed not only for image data input by being read by a CCD scanner or the like, but also for image data input from a computer or the like. It is also possible to recognize the length of the recording sheet using a nonstandard function (an NSF signal) instead of using a DIS signal, serving as a standard function, determined by the ITU-U. In this case, it is possible to use letter paper or legal paper used in North America.

When performing time transmission, the operator can select between the processing shown in FIG. 2 and the processing shown in FIG. 7. At that time, the operator inputs the selected processing through the keyboard 8. The CPU 1 stores the selection information in the third RAM 5, and performs the selected processing during time transmission.

The individual components designated by blocks in the drawings are all well known in the communication apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus comprising:
    first recognition means for recognizing the number of input lines for each page for image data of a plurality of pages input by image input means;
    storage means for storing the image data input by the image input means;
    transmission means for transmitting the image data stored in said storage means to a communication partner's terminal;
    second recognition means for recognizing the number of recordable lines per page of a recording sheet used in the communication partner's terminal; and
    control means for combining image data of a plurality of consecutive pages, including a plurality of pages including image data input separately from each other by the input means, into combined image data, and for causing said transmission means to transmit the combined image data as image data for one page, based on the number of input lines recognized by said first recognition means and the number of recordable lines recognized by said second recognition means.

2. A communication apparatus according to claim 1, further comprising:
    selection means for enabling an operator to select if the pages of a plurality of image data are to be combined together,
    wherein said control means performs a combining operation in accordance with a result of the selection by said selection means.

3. A communication apparatus according to claim 1, further comprising the image input means, wherein said image input means comprises image reading means, such as a CCD (charge-coupled device) scanner or the like.

4. A communication apparatus according to claim 1, wherein said second recognition means recognizes the number of recordable lines per page of the communication partner's terminal based on standard-reception-capability information of the call-receiving terminal obtained from a digital identification signal conforming to the ITU-T (International Telecommunication Union-Telecommunication Standardization Sector) recommendation.

5. A communication apparatus according to claim 1, wherein said control means causes transmission of image data for one page obtained by combining image data for two consecutive pages for a same communication partner within such a range that the number of input lines recognized by said first recognition means does not exceed the number of recordable lines recognized by said second recognition means.

6. A communication apparatus according to claim 1, wherein said control means causes transmission of image data for one page obtained by combining image data for an arbitrary number of consecutive pages for a same communication partner within such a range that the number of input lines recognized by said first recognition means does not exceed the number of recordable lines recognized by said second recognition means.

7. A communication apparatus according to claim 1, wherein said communication apparatus comprises a facsimile apparatus.

8. A communication apparatus according to claim 1, wherein the plurality of pages including image data input separately from each other have respective document identification information and are designated for the same receiver.

9. A communication method comprising:
    a first recognition step of recognizing the number of input lines for each page for image data of a plurality of pages input at an image input step;
    a storing step of storing the image data input at the image input step;
    a transmission step of transmitting the image data stored in said storage step to a communication partner's terminal;
    a second recognition step of recognizing the number of recordable lines per page of a recording sheet used in the communication partner's terminal; and
    a control step of combining image data of a plurality of consecutive pages, including a plurality of pages including image data input separately from each other by the input step, into combined image data, and of causing said transmission step to transmit the combined image data as image data for one page, based on the number of input lines recognized by said first recognition step and the number of recordable lines recognized by said second recognition step.

10. A communication method according to claim 9, further comprising:
    a selection step of enabling an operator to select if the pages of a plurality of image data are to be combined together,
    wherein said control step performs a combining operation in accordance with a result of the selection by said selection step.

11. A communication method according to claim 9, further comprising the image input step, wherein said image input step uses image reading means, such as a CCD (charge-coupled device) scanner or the like.

12. A communication method according to claim 9, wherein said second recognition step recognizes the number of recordable lines per page of the communication partner's terminal based on standard-reception-capability information of the call-receiving terminal obtained from a digital identification signal conforming to the ITU-T (International Telecommunication Union-Telecommunication Standardization Sector) recommendation.

13. A communication method according to claim 9, wherein said control step causes transmission of image data for one page obtained by combining image data for two consecutive pages for a same communication partner within such a range that the number of input lines recognized by said first recognition step does not exceed the number of recordable lines recognized by said second recognition step.

14. A communication method according to claim 9, wherein said control step causes transmission of image data for one page obtained by combining image data for an arbitrary number of consecutive pages for a same communication partner within such a range that the number of input lines recognized by said first recognition step does not exceed the number of recordable lines recognized by said second recognition step.

15. A communication method according to claim 9, wherein said communication method is operative in a facsimile apparatus.

16. A communication method according to claim 9, wherein the plurality of pages including image data input separately from each other have respective document identification information and are designated for the same receiver.

* * * * *

UNITED STATES PATENT AND TRADEMARK OFFICE
CERTIFICATE OF CORRECTION

PATENT NO. : 6,088,131
DATED : July 11, 2000
INVENTOR(S) : Satoshi Imai et al.

It is certified that error appears in the above-identified patent and that said Letters Patent is hereby corrected as shown below:

Column 1,
Line 37, "if" should read -- is --.

Column 2
Line 58, "a" should read -- A --.

Column 4,
Line 20, "of" should be deleted.

Column 5,
Line 8, "that," should read -- that --.

Column 6,
Line 1, "ith" should read -- i - th --.

Column 7,
Line 12, "$X_{i+j}$" should read -- $x_{i+j}$- --.

Column 9
Line 26, "image data input separately from each other" should read -- at least one page of a first job and at least one page of a second job, the first and second jobs being input independently from each other by the input means and pages within each job being input dependently on each other, --.
Line 27, "by the input means, "should be deleted.

UNITED STATES PATENT AND TRADEMARK OFFICE
CERTIFICATE OF CORRECTION

PATENT NO.   : 6,088,131
DATED        : July 11, 2000
INVENTOR(S)  : Satoshi Imai et al.

It is certified that error appears in the above-identified patent and that said Letters Patent is hereby corrected as shown below:

Column 10,
Line 25, "image data input separately from each other" should read -- at least one page of a first job and at least one page of a second job, the first and second jobs being input independently from each other by the input step and pages within each job being input dependently on each other, --.
Line 26, "by the input step," should be deleted.

Signed and Sealed this

Second Day of October, 2001

Attest:

NICHOLAS P. GODICI
Attesting Officer
Acting Director of the United States Patent and Trademark Office